(12) United States Patent
Liang et al.

(10) Patent No.: US 7,583,702 B2
(45) Date of Patent: Sep. 1, 2009

(54) METHOD OF TRANSMITTING PAGING INDICATOR AND NOTIFICATION INDICATOR AND CORRESPONDING MODULATION AND DEMODULATION DEVICES

(75) Inventors: Zongchuang Liang, Shanghai (CN); Hua Chao, Shanghai (CN); Xin Xu, Shanghai (CN); Luoning Gui, Shanghai (CN)

(73) Assignee: Alcatel Lucent, Paris (FR)

( * ) Notice: Subject to any disclaimer, the term of this patent is extended or adjusted under 35 U.S.C. 154(b) by 556 days.

(21) Appl. No.: 11/295,597

(22) Filed: Dec. 7, 2005

(65) Prior Publication Data

US 2006/0128400 A1 Jun. 15, 2006

(30) Foreign Application Priority Data

Dec. 13, 2004 (CN) ............ 2004 1 0089444

(51) Int. Cl.
*H04J 1/00* (2006.01)
(52) U.S. Cl. ............ 370/483; 455/102; 455/110; 332/100; 332/103; 370/335
(58) Field of Classification Search ........... 370/215, 370/236.2, 277, 320, 342, 441, 252, 310, 370/321, 436, 437, 483, 203, 206, 207, 479, 370/328–339; 455/574, 67.1, 503, 414, 424, 455/425, 456.5, 456.6, 63.1, 561, 102, 110, 455/116, 205, 334, 337, 550.1, 575.1; 709/238, 709/217; 332/100, 103, 101, 104, 128, 144, 332/145

See application file for complete search history.

(56) References Cited

U.S. PATENT DOCUMENTS 5,386,239 A * 1/1995 Wang et al. ............ 348/472
5,518,578 A * 5/1996 Persells et al. ............ 156/580.1
6,272,190 B1 * 8/2001 Campana, Jr. ............ 375/347
6,934,432 B1 * 8/2005 Rudigier ............ 385/16

(Continued)

FOREIGN PATENT DOCUMENTS

EP 0961515 A1 12/1999

(Continued)

OTHER PUBLICATIONS

Samsung-Tdoc R1-040,252, Title-Discussion on the open issues for notification, 3GPP TSG-Ran WG1 #36, Malaga, Spain, Feb. 16-20, 2004.*

(Continued)

*Primary Examiner*—Duc Nguyen
*Assistant Examiner*—Charles Chow
(74) *Attorney, Agent, or Firm*—Fay Sharpe LLP

(57) ABSTRACT

The present invention discloses a method of transmitting a first signal and a second signal in a wideband code-division multiple access network, wherein a probability of the appearance of signal bit "1" or "0" in each signal of the first signal and the second signal is remarkably higher than a probability of the appearance of "0" or "1", the method including: a step of determining constellation points, for determining combinations of different states of the first signal and the second signal and for determining each combination as a constellation point; a step of determining locations of constellation points, for determining a location of each constellation point on I-Q plane based on a priori knowledge of said combination; and a step of transmission, for, after modulating said different combinations in different ways according to the location of each constellation point, transporting them to a user equipment via a physical channel. Through joint modulation on the paging indicator and the notification indicator, the transmission method according to the present invention significantly reduces power consumption.

11 Claims, 12 Drawing Sheets

U.S. PATENT DOCUMENTS

| | | | |
|---|---|---|---|
| 7,233,810 B2* | 6/2007 | Medlock et al. | 455/560 |
| 2003/0123396 A1* | 7/2003 | Seo et al. | 370/252 |
| 2004/0022213 A1* | 2/2004 | Choi et al. | 370/332 |
| 2005/0118992 A1* | 6/2005 | Jeong et al. | 455/422.1 |
| 2005/0181731 A1* | 8/2005 | Asghar et al. | 455/63.1 |
| 2005/0186973 A1* | 8/2005 | Gaal et al. | 455/458 |
| 2005/0259622 A1* | 11/2005 | Czaja et al. | 370/335 |
| 2006/0019641 A1* | 1/2006 | Vayanos et al. | 455/414.1 |
| 2006/0135073 A1* | 6/2006 | Kurapati et al. | 455/67.11 |
| 2007/0064669 A1* | 3/2007 | Classon et al. | 370/347 |
| 2007/0254679 A1* | 11/2007 | Montojo et al. | 455/458 |
| 2007/0265016 A1* | 11/2007 | Kahtava et al. | 455/452.2 |
| 2008/0025241 A1* | 1/2008 | Bhushan et al. | 370/312 |
| 2008/0107161 A1* | 5/2008 | Xu et al. | 375/224 |
| 2008/0130580 A1* | 6/2008 | Chaponniere et al. | 370/331 |
| 2008/0139113 A1* | 6/2008 | Ho et al. | 455/7 |
| 2008/0151805 A1* | 6/2008 | Vayanos et al. | 370/312 |
| 2008/0167042 A1* | 7/2008 | Kitazoe | 455/436 |
| 2008/0227449 A1* | 9/2008 | Gholmieh et al. | 455/434 |

FOREIGN PATENT DOCUMENTS

| | | |
|---|---|---|
| EP | 1465444 A2 | 10/2004 |
| WO | WO 00/11845 A1 | 3/2000 |

OTHER PUBLICATIONS

3GPP TSG RAN WG2 Meeting #39, R2-032608, MBMS Common paging with 1 UE DRX cycle, Source: Samsung—Nov. 17-21, 2003.
3GPP TSG RAN WG1 Meeting #36, R1-040252, Discussion on the open issues for notification, Source Samsung—SFeb. 16-20, 2004.
3GPP TSG RAN WG1 Meeting #36, R1-040287, Physical Channel for MBMS Paging Indicator, Source Philips—Feb. 16-20, 2004.
3GPP TSG RAN WG1 Ad-Hoc Meeting, R1-040069, Paging Indicator Channel for MBMS, Source Philips—Jan. 27-30, 2004.
3GPP TSG RAN WG1 Meeting #36, R1-040251, MICH Structure, Source Samsung—Feb. 16-20, 2004.
3GPP TSG RAN WG1 Ad-Hoc Meeting, R1-040088, MBMS PICH, Source Qualcomm—Jan. 27-30, 2004.
3GPP TSG RAN WG1 Ad-Hoc Meeting, R1-040018, Physical Layer Issues for MBMS Notification, Source Samsung—Jan. 27-30, 2004.
V. Vanghi, S. Sarkar, Performance of WCDMA Downlink Access and Paging Indicators in Multipath Rayleigh Fading Channels, the 14th IEEE 2003 International Symposium on Personal, Indoor and Mobile Radio Communication Proceedings, pp. 331-335.
X. -H. Peng, On Signalling Issues for the High Speed Downlink Packet Access in UMTS, 3G Mobile Communication Technologies, May 8-10, 2002, Conference Publication No. 489 IEE 2002, pp. 137-140.
3GPP TS 25.211 v6.1.0 Physical channel and mapping of transport channels on physical channels (FDD) 3GPP TSG RAN WG1, Meeting #37, R1-040520, Reducing the false alarm probability on MICH decoding—Jun. 2004.
3GPP TSG RAN WG2 MBMS Adhoc Meeting, R2-040758, Reducing the false alarm probability on MICH decoding—Apr. 20-22, 2004.
3GPP TSG RAN WG1, Meeting #37, R1-040520, Reducing the false alarm probability on MICH decoding—May 10-14, 2004.
3GPP TSG RAN WG2 meeting #41, R2-040543, False Alarm on MICH—Feb. 16-20, 2004.
3GPP TSG RAN1 #37b (Rel-6 AH), R1-040713, Discussion and proposal for MICH coding and mapping—Jun. 21-24, 2004.
3GPP TSG RAN WG1/2 Adhoc meeting Rel-6, R1-040779, Comparison of MBMS notification procedures and their possible enhancements—Jun. 21-24, 2004.
2GPP TSG RAN WG1 Meeting #38, R1-040867, MBMS notification procedure on MICH—Aug. 16-20, 2004.
3GPP TSG RAN WG1 meeting #37, R1-040536, False Alarm on MICH—May 10-14, 2004.
3GPP TSG RAN WG1 #37b, R1-040714, Detailed proposal for NI mapping—Jun. 21-24, 2004.
3GPP TSG RAN WG1 #38, R1-040848, On MICH mapping—Aug. 16-20, 2004.
3GPP TS 25.346, Introduction of Multimedia Broadcast/Multicast Services (MBMS) in the Radio Access Network (RAN)—Jun. 2005.
3GPP TS 23.246, Multimedia Broadcast/Multicast Services (MBMS); Architecture and functional description—Sep. 2005.
U.S. Appl. No. 11/295,609, filed Dec. 7, 2005, entitled "Method and Device of Transmitting Notification Indicator of Multimedia Broadcast/Multicast Services".
"3GPP TS 25.346 Introduction of the Multimedia Broadcast Multicast Service (MBMS) in the Radio Access Network (RAN)" 3GPP TS 25.346 V6.0.0, Mar. 2004, pp. 1-50, XP002307039.
Philips: "R2-040304, Other options for reusing R99 paging occasions also for MBMS paging" TSG RAN Working Group 2 (Radio Layer 2 and Radio Layer 3), Jan. 12, 2004, pp. 1-6, XP002326062.
"R2-032517, MBMS notification mechanism" 3GPP TSG-RAN Working Group 2 Meeting on MBMS, Nov. 17, 2003, pp. 1-4, XP002325060.

* cited by examiner

METHOD OF TRANSMITTING PAGING INDICATOR AND NOTIFICATION INDICATOR AND CORRESPONDING MODULATION AND DEMODULATION DEVICES

CROSS-REFERENCE TO RELATED APPLICATION(S)

This application is based on the Chinese Patent Application No. 200410089444.3 filed on Dec. 13, 2004, the disclosure of which is hereby incorporated by reference thereto in its entirety, and the priority of which is hereby claimed under 35 U.S.C. §119.

FIELD OF THE INVENTION

The present invention relates to wideband code-division multiple access (WCDMA) in the third-generation mobile communication, and specifically to a method for transmitting paging indicator and notification indicator (NI) of multimedia broadcast/multicast services (MBMS) in WCDMA, as well as corresponding modulation and demodulation devices.

BACKGROUND OF THE INVENTION

In personal mobile communication, since the power available for a user equipment (UE) is very limited, it is a critical problem to save the UE power as much as possible in order to extend the stand-by time of UE. Currently, a widely recognized method of effectively reducing the UE power consumption is to adopt Discontinuous Receiving (DRX) technology, i.e. to make UE periodically close its receiving unit so as to enter Idle mode. This method is remarkably effective for saving power.

A necessary procedure for converting the UE from Idle mode into Active mode is Paging Procedure. This procedure is implemented via paging control channel (PCCH), paging channel (PCH), secondary common control physical channel (S-CCPCH) and paging indicator channel (PICH) in WCDMA. In idle mode, the UE needs to complete periodical supervision procedure in order to monitor paging channel; once receiving paging information related to the UE itself, the UE is converted into active mode and receives the paging from the network. The above-mentioned monitoring in periodical supervision procedure is realized through monitoring paging indicator. The paging indicator is sent once via paging indicator channel (PICH) in every cycle. If on the PICH, the identification bit corresponding to the paging group to which the UE belongs is set as 1, the UE decodes the paging channel immediately coming in the next slot; if the identification bit is 0, then the UE immediately returns to sleep mode, which significantly decreases the power consumption of power supply.

Therefore, the using of the paging indicator channel (PICH) becomes the crux for effectively improving the performance of the paging procedure in the UMTS terrestrial radio access network (UTRAN) of universal mobile telecommunication system (UMTS).

As a non-directional, point-to-multipoint bearing transmission mode within a cell, multimedia broadcast/multicast services (MBMS) has drawn more and more attention with the development of 3G mobile communication. This mode transmits data from a single source entity to multiple sink receiving points, and moreover, its advanced function of data distribution raises the utilization efficiency of wireless sources to a maximum. In addition, compared with the original multicast services in wireless communication, this mode effectively improves the utilization ratio of wireless bandwidth since it supports higher transmission rates.

Like conventional services, MBMS also requires the service notification procedure which is similar to the paging operation. After the "Session" starts, the notification procedure will notify the UE of MBMS data transferring which is currently and about to be conducted. Likewise, the task that the UE periodically monitors the notification procedure is performed through monitoring the notification indicator (NI). In order to differentiate common paging indicator channel (PICH), the channel bearing NI is marked as the notification indicator channel (MICH).

Like the PICH and PI, the basic object of realizing the MICH and NI is to save the consumption of UE's power supply as much as possible. To achieve this object, it is necessary to transmit NI to each UE precisely and rapidly. However, in the prior art, only in the c/sh/m sub-layer of the Media Access Control (MAC) layer in the Radio Network Controller (RNC) are provided queues for sequencing paging messages, whereas a corresponding control mechanism with respect to notification messages and notification indicator is still lacking.

In a conventional Paging Procedure, the RNC first divides all UEs into groups. The numbers of groups allowable under the protocols are 18, 36, 72 and 144, corresponding to 18, 36, 72 and 144 PI values. A concrete way of grouping is as illustrated by expression (1):

$$PI = \{IMSI \text{ div } 8192\} \bmod N_p \quad (1)$$

wherein $N_p$ is the number of groups divided, which may be one of 18, 36, 72 and 144; IMSI denotes an international mobile subscriber identifier, for identifying a GSM subscriber; div denotes division operation, and mod denotes modulus operation.

As seen from expression (1), the RNC finishes grouping UEs after such calculation, that is, the value of PI indicates which paging group the UE is assigned to. This means that PI of a certain UE must be an integer from 0 to $N_p-1$.

The international mobile subscriber identifier (IMSI) defined in the Rel-99 is used for identifying a GSM subscriber, the format of which is as shown in FIG. 1. In the figure, the MCC indicates the country which the UE belongs to, having a length of 3 decimal digits; the MNC indicates the network range which the UE falls into, having a length of 2-3 decimal digits; the MSIN is the identification number of the UE per se, having a length of 9-10 decimal digits; thus, the IMSI has a total length of 15 decimal digits.

It should be pointed out that, the notification procedure in MBMS is directed to services other than the UE per se, and hence, the grouping procedure is also aimed at services. The principle of grouping in notification is the same as that during the Paging Procedure, and the only difference is that the MSIN in FIG. 1 is replaced by MBMS service Ids. The MCC, MNC and MBMS service Ids are termed TMGI as a whole, and then, the grouping method during the notification procedure of MBMS is as illustrated by expression (2):

$$NI = TMGI \bmod M_n \quad (2)$$

where the TMGI is a decimal digit formed by MCC, MNC and MBMS service Ids, and $M_n$ is available maximum number of groups of MBMS to be divided.

Thus, different from the original paging, the Notification Procedure is directed to services other than the UE per se. Consequently, false alarm with respect to a certain or several services, if there any, will lead to unnecessary power consumption of numerous subscribers of the service(s). Therefore, there is a need to increase the maximum dimension $M_n$ as much as possible so as to accordingly reduce the service number of each divided group as much as possible. Of course, it is impossible to reduce this number unlimitedly, because with the growing increase of future MBMS services, this number is also allowed to increase properly on condition that the performance of false alarm is not impaired.

In general, NI is loaded in a radio frame of the MICH. There are three existing designing methods with respect to the MICH frame structure:

1) MICH Multi-map Structure

In PICH structure design as defined in the Rel-99, each PI is mapped to its PI bitmap and to the number of group divided $N_p$ in PICH, respectively. Thereby, the maximum number of groups divided by PI is equal to the maximum value of grouping, i.e. 144. However, in the future third-generation (3G) mobile communication, there might be tens of or even hundreds of thousands of MBMS services in each cell. Thus, the maximum dimension $M_n$ of grouping MBMS services is far from enough if it is merely maintained at the level of the existing number $N_p$ of grouping.

To this end, 3GPP TSG RAN WG2 Meeting #39, R 2-032608, MBMS Common paging with 1 UE DRX cycle, Source: Samsung and 3GPP TSG RAN WG2 MBMS Adhoc Meeting, R2-040758, Reducing the false alarm probability on MICH decoding proposes an implementation method of using a plurality of original locations of group identification to express NI of one MBMS service in the MICH. As shown in FIG. 2, suppose there are 4 groups divided in the original MICH, i.e. $N_p=4$. With the method of one-to-one mapping, the maximum range for the maximum dimension $M_n$ is 4, that is, only 4 MBMS groups can be divided into. However, with the method of one-to-two mapping, the maximum dimension $M_n$ will reach a maximum range of 6. In this way, the value range of the maximum dimension $M_n$ widens.

Referring to FIG. 2, suppose the original mapped location number of the MICH is $N_p$ and the map number adopted is m, then the obtained $M_n$ is as illustrated by expression (3):

$$M_n = C_{N_p}^m = \frac{N_p!}{m! \cdot (N_p - m)!} \quad (3)$$

That is to say, $M_n$ equals to the combination of m from the mapped location number $N_p$.

There is no doubt that the adopting of such a multi-map way can increase categories of divided groups of MBMS services. The false alarm performance is as shown in 3GPP TSG RAN WG2 MBMS Adhoc Meeting, R2-040758, Reducing the false alarm probability on MICH decoding. Thus, if two NIs, i.e. NI1 and NI2, fall into the same MBMS group, the radio frame structure of the MICH is as shown in FIG. 3. It can be seen from FIG. 3 that, since the two NI fall into the same group, the identifiers of their NIs in plural MICH frames completely coincide and then false alarm arises.

To sum up, the multi-map way has the following characteristics:

A notable advantage of the MICH map way lies in the capability of effectively expanding the mapping range of MBMS groups within one MICH radio frame. Therefore, it is of practical significance to decrease the UE false alarm ratio and reduce the UE power consumption.

On the other hand, a tangible disadvantage of the MICH map way lies in being not conducive to transmission of plural NIs in one MICH radio frame. As is clear from FIG. 2, the most unfavorable situation is that if two NIs needs to be mapped to the first map mode and the sixth map mode on the right-hand side of the figure, then all of PI1, PI2, PI3 and PI4 in the entire MICH have mapping. Here, six possible modes all exist, i.e., new false alarm and error detection crops up. As a result, the grouping performance declines greatly.

The MICH map way trades the MICH wireless transmission performance for the advantage of false alarm ratio in MBMS grouping. Since the inspection and decision of the map way require simultaneous correct decision of a plurality of map bits, the overall MICH wireless transmission performance is somewhat abated.

2) MBMS Grouping Decision of a Plurality of Radio Frames

Based on the existing PICH scheme, as known from the above, there are two good ways to effectively reduce the false alarm ratio: one is to increase the value range of the maximal alarm dimension $M_n$ and the other is to improve the MICH power consumption. They reflect the two sides of this problem. The solution scheme of the present method is to impose new restrictions on the time axis, which can be realized through defining a random sequence which is in a number much greater than the grouping number $N_p$. In this way, the possibility that two different MBMS services completely overlap with each other in an entire notification interval is lowered significantly. In other words, the UE reduces its own false alarm probability through reading more MICH radio frames in the notification cycle. A more extreme situation is that a user who receives MBMS services on his initiative will keep reading the MICH until he identifies correctly the service, in which case the false alarm probability is 0 theoretically. The simplest way to define the random sequence is to generate a pseudo-random (PN) sequence via a shift register. Different MBMS services use different seeds of the register so as to be located in different locations of the sequence.

Thus, if two different NIs, namely NI1 and NI2, fall into one identical notification interval, then their locations in the MICH are as shown in FIG. 4. As is clear from FIG. 4, although NI1 and NI2 have the same identification location in the first frame, they can be separated from each other through reading subsequent frame(s), so that the false alarm ratio is reduced.

In a word, the method has distinct properties which are summarized as follows:

This grouping scheme produces effective results for improving the UE false alarm ratio performance. As seen from protocols, a number of MICH frames will be sent in one notification adjustment period. If one frame is divided into $N_p$ groups, then the total number $M_n$ of divided groups for k MICH frames is $(N_p)^k$. For example, take $N_p=18$ as a typical value, when $k \geq 3$, $M_n$ will reach a fairly large value.

Like the first scheme, when multiple NIs are needed in a sequence, this grouping method will generate additional false alarm(s); when each MICH frame contains multiple NIs, the UE cannot set up one-to-one corresponding sequence relation for different NIs in different MICH frames, and thereby, more additional alarms are inevitable.

Similarly, the overall wireless transmission performance of MICH for this grouping method is also affected to a different degree. Since in the original PICH, the UE needs to decode correctly one PI symbol only; however, the current UE needs to decode continuously and correctly k symbols in the MICH. So the overall receiving performance is affected to some degree. It is more important that, due to real-time change of wireless transmission conditions among different MICH frames, the transmission performances are different or even varies considerably. Therefore, the overall decision performance is also subject to more serious influence.

The largest deficiency of this method lies in the long duration for the UE to read the MICH. To identify whether the MICH contains NIs of MBMS services subscribed for itself, each UE needs to read several MICH radio frames. Thus, the UE power consumption is increased, making it impractical in engineering practices.

3) Discontinuous Arrangement of Modulating Bit in the MICH

This scheme mainly focuses on the mapping relation between NI symbols and modulating bit in the MICH. In the Rel-99, a modulating bit corresponding to each PI symbol is continuous. Thus, if this mechanism goes on, the structures of the PICH and the MICH are as shown in FIG. 5.

As seen from FIG. 5, suppose the UE is in idle mode, then the UE will awake in a paging occasion belonging to a specific UE within every DRX cycle, so as to monitor PI segment belonging to itself on the PICH. Since the protocol prescribes that there is no specific paging occasion in the MICH design of MBMS, the MICH reading will resort to paging occasion when the UE is in idle mode. Since the UE-based PI (relevant to subscriber identifier) and MBMS services-based NI (relevant to services identifier) are totally irrelevant to each other, the corresponding PI segment and NI segment probably will not be superposed. In view of this, the duration for the UE to read the indicator channel is lengthened. The most unfavorable situation is that maybe the UE need to read indicator channel information as long as 10 ms.

3GPP TSG RAN WG1 Ad-hoc, R1-040088, MBMS PICH and 3GPP TSG RAN1 #37b (Rel-6 AH), R1-040713, Discussion and proposal for MICH coding and mapping puts forward a method of discontinuous arrangement of PI modulating bit, which is as shown in FIG. 6.

In the method as illustrated in FIG. 6, several identical segments are reproduced from NI according to the bit number of PI and then distributed to each sub-frame, respectively. These sub-frames are obtained through evenly segmenting the entire PICH frame. Thereby, no matter when PI awakens the UE for monitoring, it is guaranteed that one sub-segment of NI can be monitored while the UE is awake, so that the notification indicator is obtained.

What needs to be pointed out is that the present method does not change the grouping number $N_p$ of NI load in the MICH. A fundamental object of this method is to reduce the average awaking time of the UE. The essence of the method is to segment and reproduce the original NI modulating bit sets in the MICH. The concrete number of segments D is defined by the following expression:

$$D = \left\lfloor \frac{288/N_n}{288/N_p} \right\rfloor = \left\lfloor \frac{N_p}{N_n} \right\rfloor \quad (4)$$

wherein $N_p$ is PI grouping number in the PICH, and $N_n$ is NI grouping number in the MICH.

NI of the MICH in FIG. 5 is divided into D equal segments as illustrated in expression (4), which are then re-placed in the entire MICH as shown in FIG. 6. Thus, NI information is read while the UE awakes and reads PI information in a paging occasion in every DRX cycle. Obviously, the average paging time span for the UE in FIG. 6 is greatly less than the UE average paging time in FIG. 5, which is theoretically equal to 1/D of the original average paging time. According to expression (4), PI and NI obtain a same number of modulating bits in a paging period, and thereby, they have equivalent wireless interface transmission performance. Another major reason accounting for the effectiveness of this method is that, both the PICH and the MICH are common transport channels, not only their transmission power can be received by all UEs in a cell, but also it is unnecessary for most UEs to receive all energy of PI. So to split bit string under this regime is workable.

In summary, this method has the following advantages and disadvantages:

The method effectively reduces the average reading time of the PICH and the MICH for the UE in an idle state. This property decreases the UE power consumption from another perspective, since the method causes irrelevant UE to rapidly return to idle state from a state of monitoring the paging channel.

As in this method, the mapping relation between NI and the grouping number $N_p$ in the MICH does not change substantively, this method allows NIs of a plurality of MBMS to coexist in one identical MICH frame without causing additional false alarm ratio.

However, the gravest disadvantage of this method is that the grouping number $M_n$ of MBMS service identification is too small, which is merely equal to the original grouping number $N_p$. Consequently, this method fails to meet requirements of the possible number of MBMS services in a cell. Therefore, if the method is employed directly, serious UE false alarm ratio will be produced and the UE power is over-consumed.

On the other hand, with respect to MBMS, two main resources, namely channelisation code and transmission power, are required so as to realize transmission. Like the conventional PICH, the MICH also requires a channelisation code with a spreading factor equaling 256. In addition, to meet certain false alarm ratio, the MICH further needs a transmission power which is much higher than the data channel. Since the modulation mode for the conventional PICH is phase shift keying (QPSK), it is possible to perform modulation combining the PICH and the MICH using the QPSK mode, so that the two types of indicator channels can realize downlink transmission using only one SF-256 channelisation code. Such an idea has reached a common understanding in the present 3GPP standardization course. In other words, to save wireless resources as much as possible while maintaining the existing structure at the same time, the MICH can be carried on the PICH to perform transmission using the QPSK modulation mode.

Moreover, both the transmission of physical channels (S-CCPCH) bearing MBMS Control Channel (MCCH) and MBMS Traffic Channel (MTCH) and the MICH should follow the principle of power consumption optimum for selection and design.

To maintain various structures in the prior network as much as possible, joint modulation is performed on the MICH and the PICH. Through taking into comprehensive consideration various states of MBMS notification indicator and the paging indicator in the Rel-99, all possible constellation points on the I-Q plane is obtained as shown in table 1.

TABLE 1

| Constellation points | paging indicators in Rel-99 | MBMS notification indicators |
|---|---|---|
| E | ON | OFF |
| F | OFF | OFF |
| G | ON | ON |
| H | OFF | ON | all possible constellation points on the I-Q plane

It can be seen from table 1 that, the states involved in the method of joint modulation on the MICH and the PICH include only four points, namely E, F, G and H.

The initial modulation mode in the prior art is pulse amplitude modulation, which, as shown in A of FIG. 7, properly distributes the four constellation points on the I-Q plane based on difference in amplitude. In order to effectively improve the performance of power consumption and the peak-average ratio of transmission, the QPSK mode as shown in B of FIG. 7 is then adopted. In general, several problems need to be taken into account when designing of modulated constellation points: first of all, the peak-average ratio of transmission power should be as low as possible in order to raise the efficiency of power amplifier as much as possible; next, the Euclidean Distance between adjacent points should be kept minimum as much as possible on the premise of guaranteeing predefined symbol error ration (SER) and bit error ratio (BER); and lastly, the most important thing is to reduce the transmission power of jointly modulated by the MICH and the PICH as much as possible.

As is clear from table 1, the constellation point "F" denotes a state where there is neither the paging indicator nor the notification indicator. For the majority of UEs, this state appears most frequently and lasts for longest in a day, the appearance probability of which is about 88%. Thus, in this modulation method, such a constellation point without any useful information consumes the same transmission power as other constellation points, which causes a considerable waste of constellation point.

Due to the introduction of MBMS, the situation of the Power Limited on downlink in a WCDMA system will deteriorate.

SUMMARY OF THE INVENTION

It is an object of the present invention to provide a method of transmitting a first signal and a second signal in a wideband code-division multiple access network, wherein a probability of the appearance of signal bit "1" or "0" in each signal of the first signal and the second signal is remarkably higher than a probability of the appearance of "0" or "1", the method including:
a step of determining constellation points, for determining combinations of different states of the first signal and the second signal and for determining each combination as a constellation point;
a step of determining locations of constellation points, for determining a location of each constellation point on I-Q plane based on a priori knowledge of the combinations; and
a step of transmission, for, after modulating the different combinations in different ways according to the location of each constellation point, transporting them to a user equipment via a physical channel.

The present invention also discloses a modulation device in a transmitter, which is for modulating a first signal and a second signal, wherein a probability of the appearance of signal bit "1" or "0" in each signal is remarkably higher than a probability of the appearance of "0" or "1", the modulation device comprising:
judgment means, for receiving a joint signal of the first signal and the second signal in a wideband code-division multiple access network and for judging which combination state the joint signal is;
pulse amplitude modulation means, for, when the judgment means decides that the joint signal is a combination state with high probability of appearance which is not required to notify a user equipment, performing pulse amplitude modulation on the joint signal and outputting the result; and
phase shift keying modulation means (1302), for, when the judgment means decides that the joint signal is a combination state which is required to notify a user equipment, performing conventional phase shift keying modulation on the joint signal and outputting the result.

The present invention further discloses a demodulation device in a signal receiver, which is for demodulating a joint signal of a first signal and a second signal, wherein a probability of the appearance of signal bit "1" or "0" in each signal of the first signal and the second signal is remarkably higher than a probability of the appearance of "0" or "1", the demodulation device (1400) comprising:
amplitude detecting pre-processor, for performing amplitude detection pre-processing on the joint signal of the first signal and the second signal, which has gone through pulse amplitude modulation and then conventional phase shit keying modulation;
amplitude detector, for performing amplitude detection on a signal, which has gone through amplitude detection pre-processing, and then outputting a constellation point whose amplitude is 0;
match filter bank, for filtering a signal remaining after the amplitude detector has performed detection and outputting; and
statistical decision means, for calculating decision statistic for a signal which is output in three paths from the match filter bank, selecting a largest decision variant and then outputting a constellation points which have gone through conventional phase shit keying modulation.

Through joint modulation on the paging indicator and the notification indicator, the present invention reduces the transmission power consumption.

BRIEF DESCRIPTION OF THE DRAWINGS

Hereinafter, a method of transmitting notification indicator according to the present invention will be described in detail with reference to the accompanying drawings, wherein.

DETAILED DESCRIPTION OF PREFERRED EMBODIMENTS

Referring to the accompanying drawings, a method of transmitting the notification indicator of Multimedia broadcast/multicast services according to the present invention will be described in detail.

Figure 8:
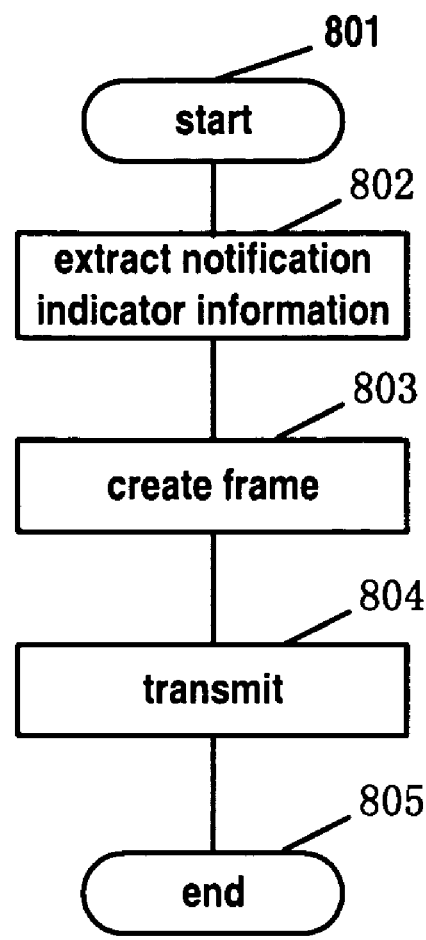
FIG. 8 is a flow chart of a method of transmitting notification indicator according to the present invention.

A flow chart of a method of transmitting the notification indicator of Multimedia broadcast/multicast services according to the present invention is as shown in FIG. 8.

The flow as shown in FIG. 8 starts with step 801. Similar to the management of paging indicator, to realize the management and transmission of notification indicator, it is necessary to first process a notification message in step 802. Then, a corresponding notification indicator information is extracted. This step is performed in the RNC.

Figure 9:
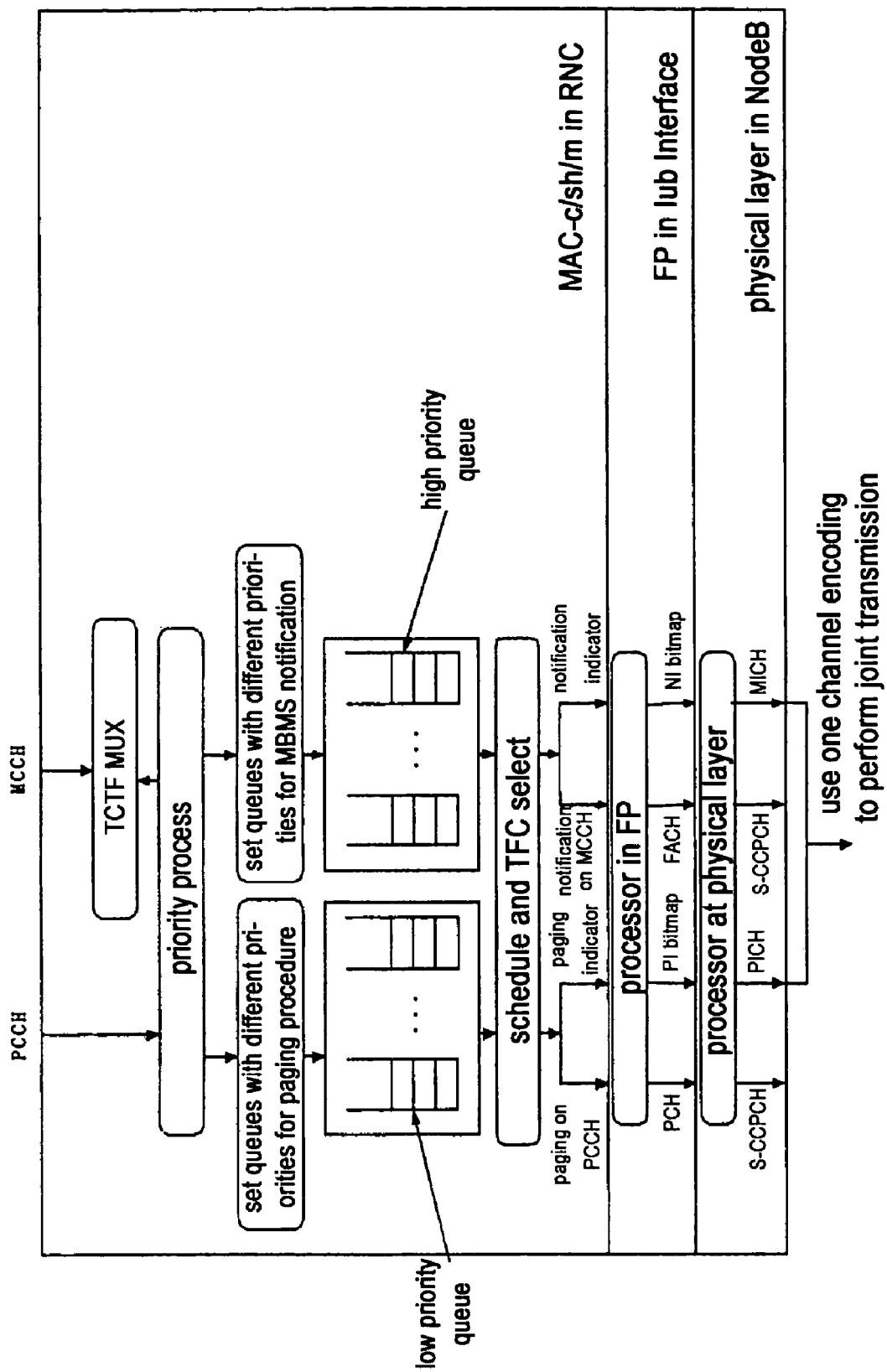
FIG. 9 is a schematic view of implementing joint processing on paging procedure and notification procedure in Media Access Control (MAC) layer of Radio Network Controller (RNC), in frame protocol layer of Iub interface, as well as in physical layer of Node B according to the present invention.

FIG. 9 illustrates a schematic view in which the RNC processes the notification message and extracts the corresponding notification indicator. As illustrated in FIG. 9, the RNC provides in its MAC-c/sh/m sub-layer a queuing mechanism for sequencing the notification messages and then sending the corresponding indicators according to the sequence.

According to the sequencing result, identification information needed for obtaining the corresponding notification indicator, namely TMGI (the service identification of MBMS, MNC and MCC), is extracted from the notification message to be transmitted. Through modulus operation on TMGI according to the aforesaid expression (2), NI is obtained as follows:

NI={TMGI} mod $M_n$ where TMGI is a decimal digit consisting of the service identification of MCC, MNC and MBMS, and $M_n$ is a maximal number of groups divided from available MBMS. The maximal number is expressed by expression (5):

$$M_n = (N_m)^D \quad (5)$$

Different from the number $N_p$ of groups divided during paging, the maximal dimension $M_n$ in expression (2) should be as large as possible, so that the number of services assigned to each group is as small as possible. It is because that:

Although the number $N_p$ of groups divided during paging in the Rel-99 is relatively small, it has another dimension restriction function in terms of grouping dividing, that is, the paging occasion for each UE. Thus, as there might be many users assigned to one identical paging group in a cell, the paging occasions of these users are usually different, so the false alarm ratio (FAR, this parameter means that the UE mistakenly thinks it is notified by NI specified location in the MICH to read subsequent notification information in the S-CCPCH, which is totally contrary to the truth) indicating UE is woken up mistakenly, which is generated due to grouping is relatively low. However, the restriction of such dimension does not exist in the notification procedure for MBMS in the Rel-6. Therefore, to reduce the false alarm ratio of UE, it is necessary to increase the maximal dimension $M_n$ as much as possible, so that the number of MBMS services in each divided group is decreased.

Generally speaking, for a function with a relatively large varying range, e.g. NI, it can always be described by a multinomial. It is because that: on the one hand, the high-order power operation of multinomial enhances the dynamic range of function to a great extent; on the other hand, due to the extremely regular expressing way of multinomial, only several parameters of small dynamic ranges are needed to be remembered in the processing procedure. Such a processing method is equivalent to increasing the transmission amount of information under circumstances of the same number of bit.

Based on this, the aforesaid expression (2) can be transformed to the following multinomial:

$$NI = \{TMGI\} \bmod M_n = \sum_{i=0}^{D-1} a_i \cdot (N_m)^i \quad (6)$$

where D is the number of sub-frames that one MICH can be divided into, $N_m$ is the number of MBMS groups in each sub-frame, $a_i$ is a weight coefficient, and $M_n$ is the maximal number of available MBMS groups divided.

Coefficient $a_i$ is defined as expression (7):

$$a_i = \begin{cases} a_{D-1} = NI \, div \, N_m^{D-1} & i = D-1 \\ a_0 = NI \bmod N_m & i = 0 \\ a_i = \left(NI - \sum_{j=i+1}^{D-1} a_j \cdot N_m^j\right) div \, N_m^i \end{cases} \quad (7)$$

where $N_m$ is the number of MBMS groups in each sub-frame, div is division operation, and mod is modulus operation.

Thus, it can be seen from expression (6) that each weight coefficient can be obtained through expression (7), and then NI is obtained.

In the present embodiment, it is set that $N_p=72$ and $N_m=18$ for example, then D=4. As is clear from expression (5), $M_n=18^4=104976$, and such a number of MBMS service groups are enough for a cell.

After completion of the calculation of parameter $a_i$ according to the aforesaid expression (7), a mapping of NI bitmap is completed based on the calculation result, with a total of D NI bitmaps. The generation of each NI bitmap is the same as the generation of a conventional PI bitmap.

Afterwards, it is judged according to the criterion shown in FIG. 9 how many NIs in the same MICH frame need to be transmitted.

Then, the above two results are transmitted to the physical layer via the Iub interface. After that, step 802 of the flow as shown in FIG. 8 ends.

Next, the flow shown in FIG. 8 enters step 803. In this step, an MICH frame according to the present invention is constructed to complete the loading of MICH frame. According to the related protocols, the notification and notification indicator information borne on the logical channel MCCH must be mapped to the transport channel (FACH). Thus, alterations as shown in FIG. 10 must be made to a data frame structure for this notification procedure, and such alterations do not go against the original protocol specifications.

Figure 10:
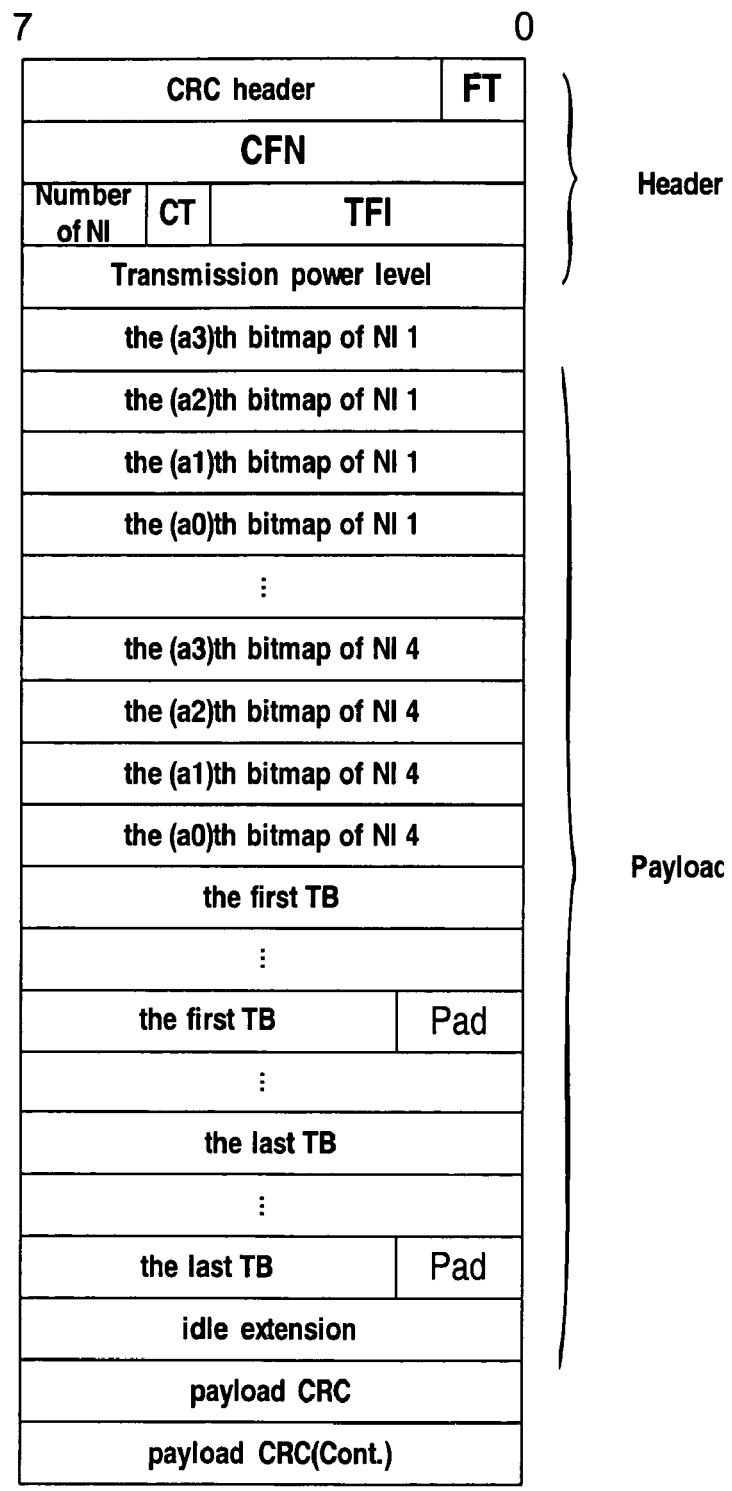
FIG. 10 is a structural schematic view of a transport channel (FACH) data frame directed to the notification procedure according to the present invention.

As shown in FIG. 10, compared with the original FACH data frame structure, the following flag bits are added:

Control Frame (CT), having a length of 1 bit: in case of 0, borne on the data frame is other control information; in case of 1, borne on the data frame is control information relevant to notification procedure. In the altered frame, CT=1, and FT=1; while in the original frame, CT=0.

Number of NI (NINum), denoting the number of NIs to be transmitted: this parameter decides how many constellation points the MICH modulation will adopt, with a length of 2 bits, and thus, is in a range of 0-3 (1-4).

"The $(a_i)$th bitmap of NI j" denoting the bit map of the ith sub-frame of the jth NI.

Then, the physical layer loads the MICH frame on the basis of the contents of this data frame.

Finally, the inter-frame processing in the MICH using System Frame Number (SFN) is no different from the original processing in the PICH.

It should be pointed out that, the original CFN range of PCH I is [0, 4095], whereas the CFN range of FACH bearing notification information is [0, 256].

This is not contradictory to the original protocol specifications, because one Notification Period corresponds to a maximal DRX period and one Notification Period includes several Repetition Periods. So, such designing guarantees that one Notification Period includes at most 16 Repetition Periods.

It can be seen from the foregoing depiction of the existing MICH frame designing structure that, simply using several MICH radio frames to identify MBMS group identification in each DRX period is not a good method for the above MICH frame. In view of this, the present invention makes improvements on the basis of the MBMS grouping decision method for a plurality of radio frames and the discontinuous arrangement method of modulating bit in the MICH in the prior art, to realize an enhanced MICH frame structure.

In the present embodiment, an MICH frame structure according to the present invention is described taking $N_p=72$, $N_m=18$, D=4 for example.

Figure 11:
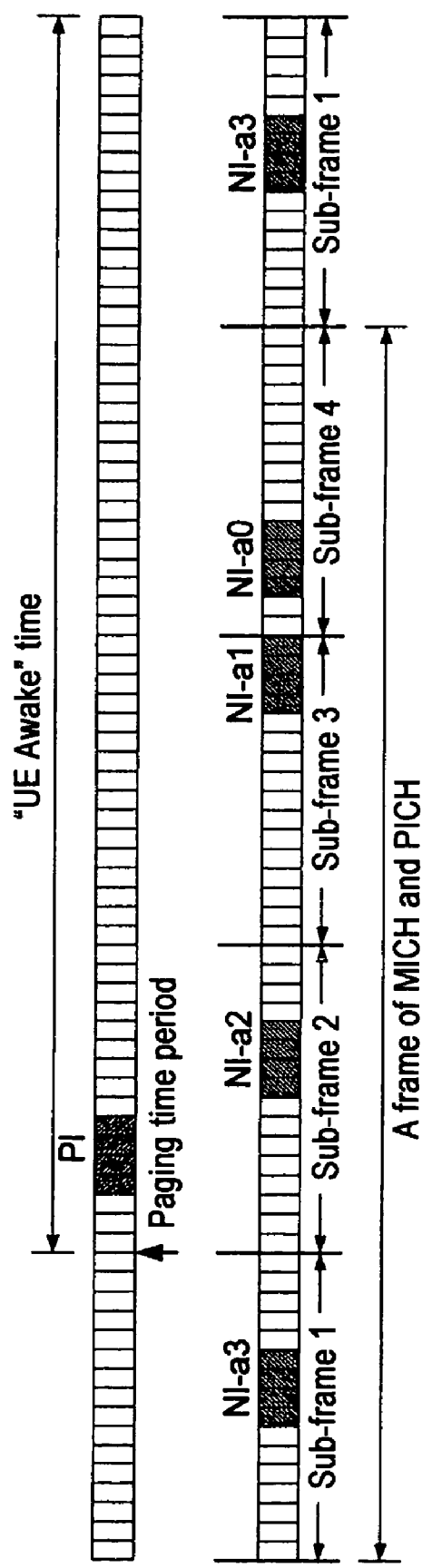
FIG. 11 is a schematic view of an enhanced notification indicator channel (MICH) frame structure according to the present invention.

As shown in FIG. 11, to form the MICH frame of the present invention, first, the MICH frame needs to be divided into D sub-frames using the above-described method of discontinuous arrangement of modulating bit in MICH; then, to match PI, the location of copied NI in each sub-frame is determined according to the number of PI grouping, which is 4 in the present embodiment, and the identification of MBMS grouping.

According to FIG. 11, the group number of TMGI of an MBMS in the entire $M_n$ set is as shown in expression (8) and expression (9):

$$NI = \{TMGI\} \bmod M_n = a_3 \cdot N_m^3 + a_2 \cdot N_m^2 + a_1 \cdot N_m + a_0 \quad (8)$$

where $$\begin{cases} a_3 = NI \ div \ N_m^3 \\ a_2 = (NI - a_3 \cdot N_m^3) div \ N_m^2 \\ a_1 = (NI - a_3 \cdot N_m^3 - a_2 \cdot N_m^2) div \ N_m \\ a_0 = NI \bmod N_m \end{cases} \quad (9)$$

After relevant parameters including weight coefficients are calculated according to expression (9) in the RNC, each weight coefficient is respectively placed in a location where NI is copied of each sub-frame, by passing to the physical layer for MICH frame loading via the Iub interface and using the above-described method of discontinuous arrangement of modulating bit in MICH. Then, step 803 of the flow as shown in FIG. 8 ends.

After that, the flow as shown in FIG. 8 enters step 804. In this step, the MICH frame is passed to the UE via physical channel. The follow-up inter-frame processing procedure performed according to the SFN in the physical layer may be totally the same as the original processing in the Rel-99 without any alteration. Then, the flow as shown in FIG. 8 ends with step 804. Thus, the UE can obtain all weight coefficients after receiving a complete frame, and a corresponding NI is obtained using expression (8), and further, it can be determined whether to enter idle state or active state.

According to an MICH frame of the present invention, a better performance of UE false alarm ratio is guaranteed, and at the same time, the UE is ensured to complete reading NI in the MICH within a radio frame interval, so that the UE's power consumption performance is improved as a whole. The most distinct difference in this method from the prior art is that, while reading a single MICH radio frame, it achieves the maximization of the number of NI grouping and the simultaneous transmission of multiple NI information.

The implementation method of enhanced MICH frame structure according to the present invention has the following advantages over the existing numerous schemes and proposals:

The implementation method of enhanced MICH frame structure according to the present invention is able to rapidly make judgment on MBMS service group identification within one MICH frame interval, so that UE's power supply consumption is saved.

Besides, this method further expands the range of MBMS grouping. Even if engineering parameters are employed, the maximal number $M_n$ of grouping can still amount to hundreds of thousand, which completely satisfies the requirement on the grouping number of a large quantity of MBMS services in a cell in future communication. Therefore, this method reduces effectively UE's false alarm ratio and further lowers UE's power consumption.

In addition, this method merely makes a few changes in the 3GPP protocol, and none of the changes conflicts with the original protocol. Moreover, the changes made in the enhanced MICH frame structure design are limited to the RNC and the Iub as possible as they can. There are no big changes in the physical layer, and the SFN-based inter-frame processing for the physical layer and the like to adapt to the time-varying wireless transmission performance keeps intact. There is no doubt that this feature helps to realize and further upgrade WCDMA system.

Through researching into the transmission power performance, the present invention further improves the modulation mode of MICH frame on the basis of the above-described existing modulation approach.

Suppose $P_{ON}$ is the transmission power needed for joint transmission of MICH and PICH, $p_E$ is a priori probability of the appearance of constellation point "E", $p_F$, $p_G$ and $p_H$ are priori probabilities of the appearance of constellation points F, G, and H, respectively. $p_r$ is a probability when PICH is "ON", and $p_q$ is a probability when MICH is "ON".

Figure 1:
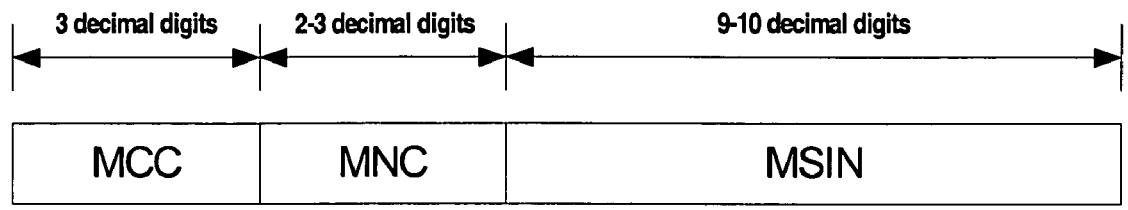
FIG. 1 is a schematic view of a format of international mobile subscriber identifier defined in the Rel-99.
Figure 2:
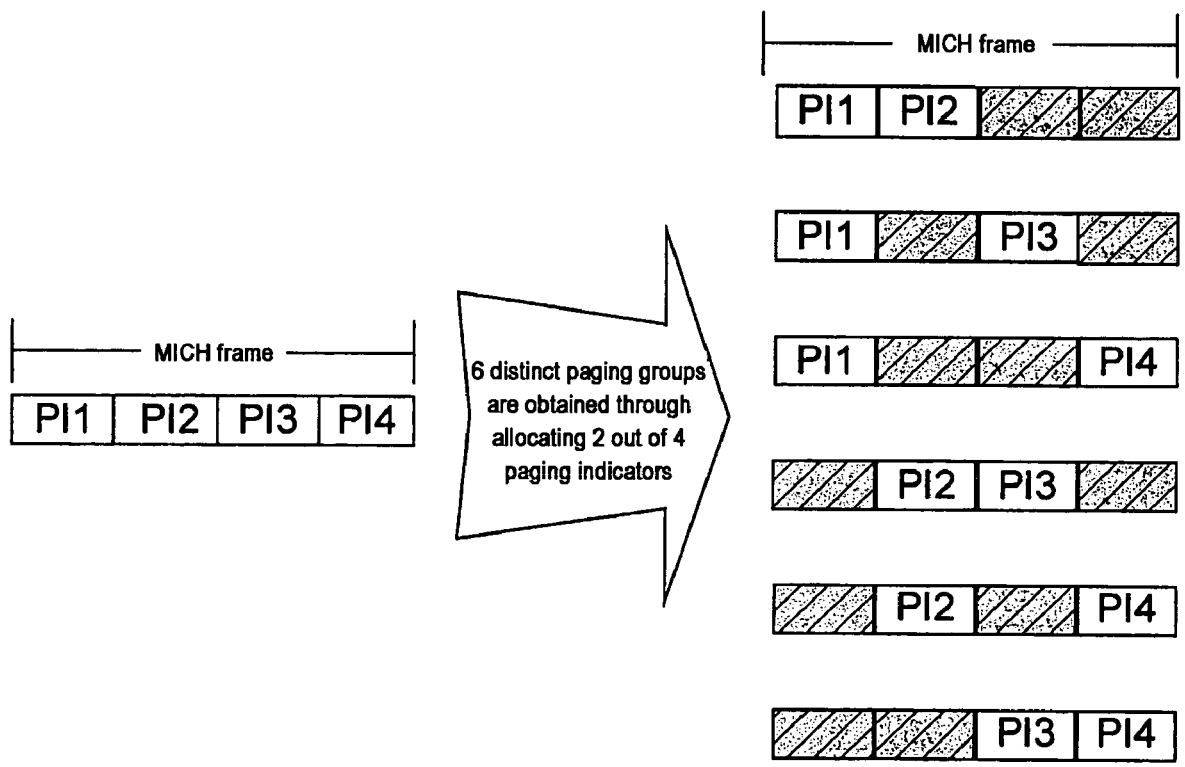
FIG. 2 is a schematic view of one-to-two mapping in a multi-map structure of notification indicator channel (MICH), which is a first implementation scheme of notification indicator channel frame structure in the prior art.
Figure 3:
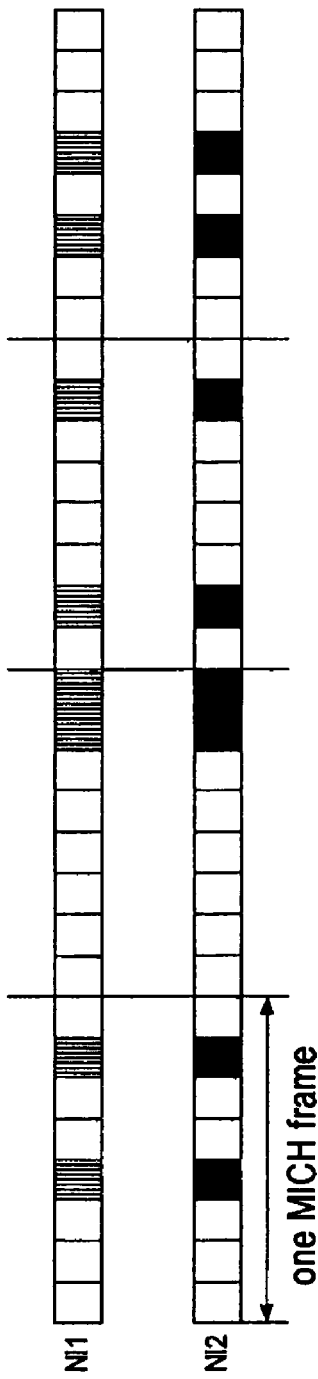
FIG. 3 is a structural schematic view of notification indicator channel (MICH) frame of different notification indicators (NI) which are in the same group, in a plurality of mapping modes, in a multi-map structure of notification indicator channel (MICH), which is a first implementation scheme of a notification indicator channel (MICH) frame structure in the prior art.
Figure 4:
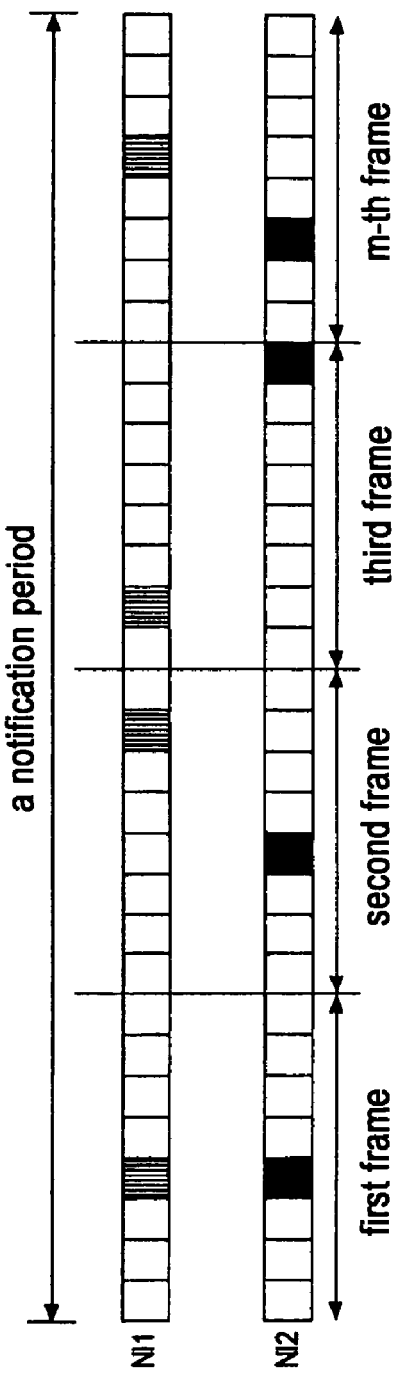
FIG. 4 is a schematic view of multimedia broadcast/multicast services (MBMS) grouping scheme that pseudo-random sequence is adopted in MBMS grouping decision of a plurality of radio frames, which is a second implementation scheme of notification indicator channel (MICH) frame structure in the prior art.
Figure 5:
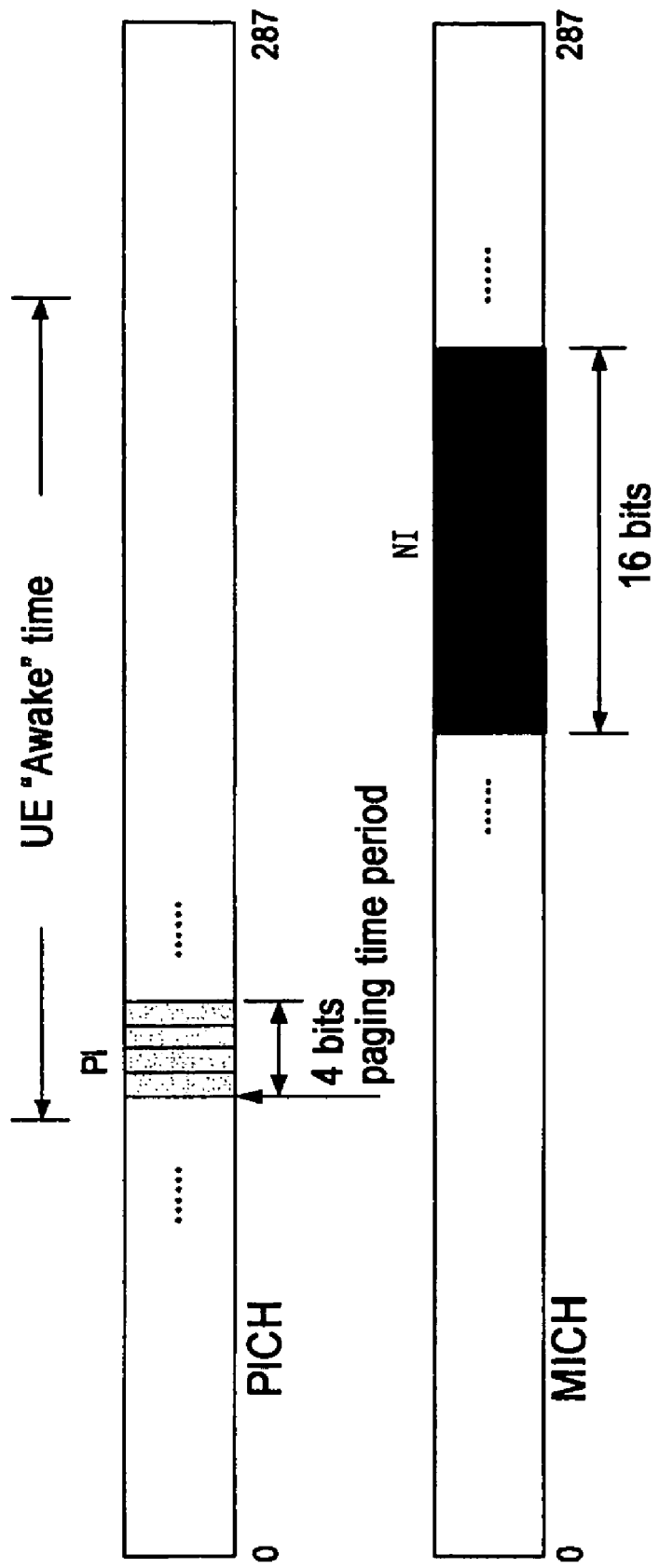
FIG. 5 is a schematic view of continuous arrangement of notification indicator (NI) modulating bit as defined in the Rel-99 of discontinuous arrangement of modulating bit in notification indicator channel (MICH), which is of a third implementation scheme of a notification indicator channel (MICH) frame structure in the prior art.
Figure 6:
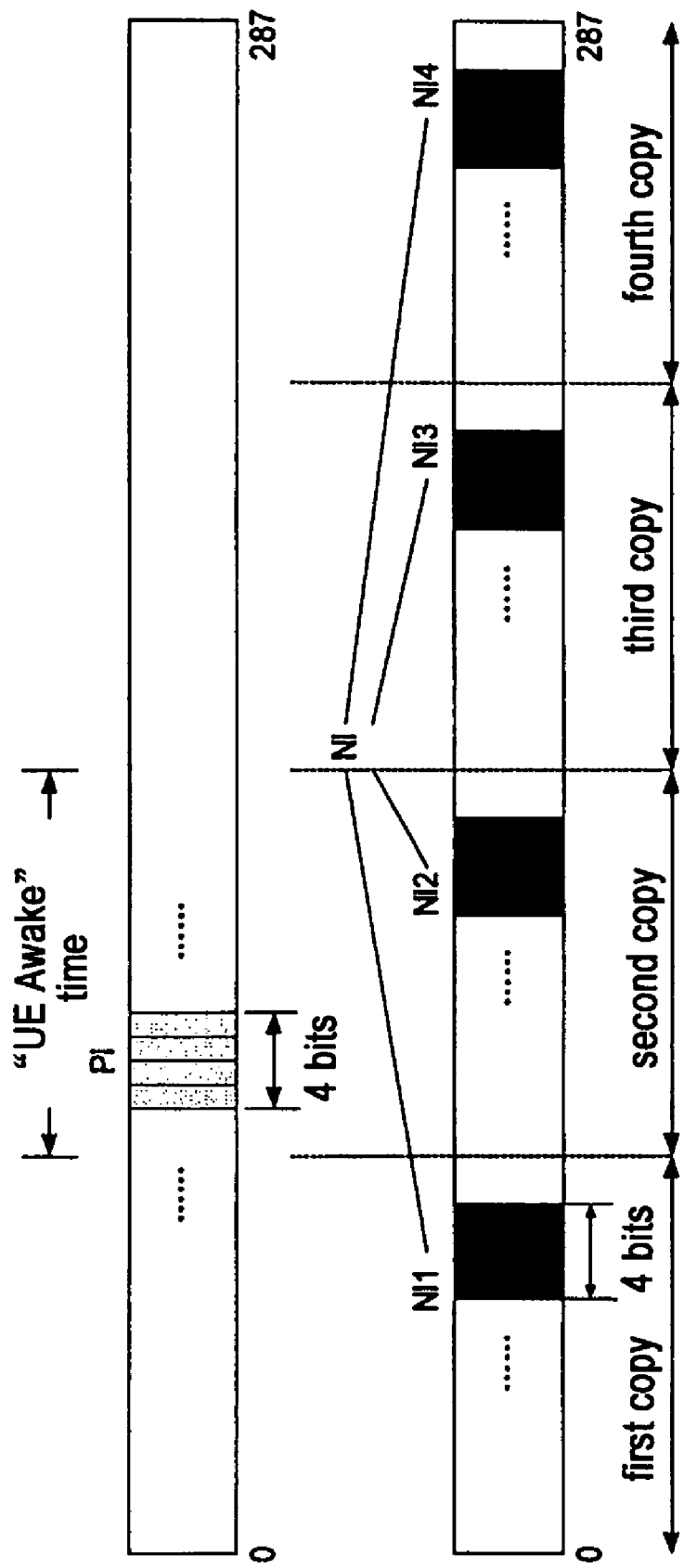
FIG. 6 is a schematic view of discontinuous arrangement of modulating bit in notification indicator channel (MICH) frame of discontinuous arrangement of modulating bit in notification indicator channel (MICH), which is a third implementation scheme of a notification indicator channel (MICH) frame structure in the prior art.
Figure 7:
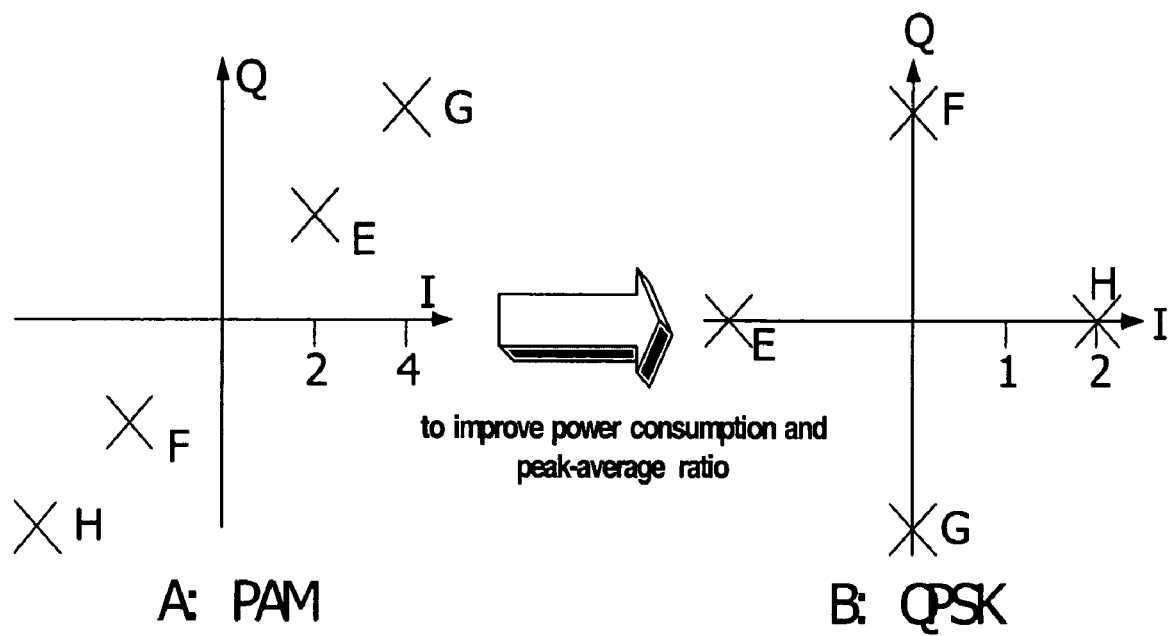
FIG. 7 is a distribution schematic view of four constellation points on I-Q plane in two modulation modes in the prior art.

The transmission power needed for QPSK modulation mode presented in FIG. 7-B is studied, which is:

$$P_{ON}=4\times(p_E+p_F+p_G+p_H)=4 \tag{10}$$

It can be seen that, the transmission power $P_{ON}$ needed for joint transmission of MICH and PICH does not change with the state change of each constellation point. On the contrary, it is a constant. On the other hand, the theoretical value of the transmission power $P_{ON}$ needed for joint transmission of MICH and PICH is studied, which should be:

$$P_{ON}=p_r\cdot(1-p_q)\cdot P_E+p_r\cdot p_q\cdot P_G+(1-p_r)\cdot p_q\cdot P_H+(1-p_r)\cdot(1-p_q)\cdot P_F \tag{11}$$

where $P_E$ is the transmission power needed for constellation point "E", and the meanings of other related parameters $P_F$, $P_G$ and $P_H$ can be reasoned out by analogy. It can be seen that, the power consumption $P_{ON}$ is theoretically relevant to a priori probability of each constellation point, which constitutes a major reason for the comparatively large power consumption of QPSK modulation.

From the perspective of utilization ratio of transmission power, the present invention reaches a conclusion that a pure QPSK modulation mode and the corresponding Maximum a Posteriori Probability Receiver are not suited to joint transmission of MICH and PICH. A more suitable method should take into consideration a priori knowledge of each information bit in NI and PI, so that a more proper transmission mode can be arranged therefor.

Based on the above analysis, the present invention presents an improved modulation mode which is more suitable for joint transmission of PICH used for paging and MICH used for MBMS notification in light of the evolution trend of protocols.

Figure 12:
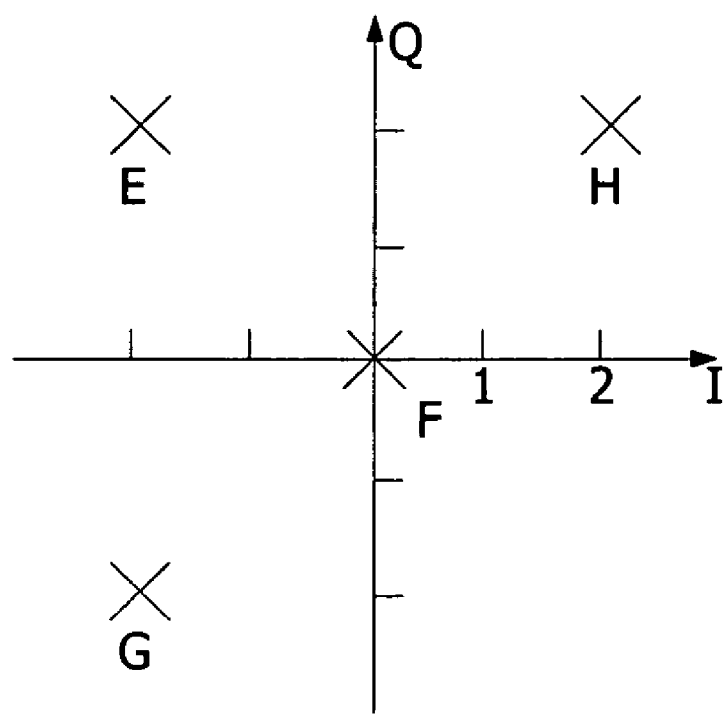
FIG. 12 is a schematic view of distribution of A-QPSK modulated constellation points according to the present invention.

As shown in FIG. 12, the modulation mode of the present invention uses different transmission power to transmit the four constellation points, i.e. "E", "F", "G" and "H", on I-Q plane. Compared with FIG. 7-B, it can be seen from FIG. 12 that the Discontinuous Transmission (DTX) mode is employed for point "F"; that is, the transmitter does not transmit any power but is in the silent period. PAM modulation mode is employed for this point, while the normal QPSK mode is employed for transmitting the other three constellation points.

Figure 13:
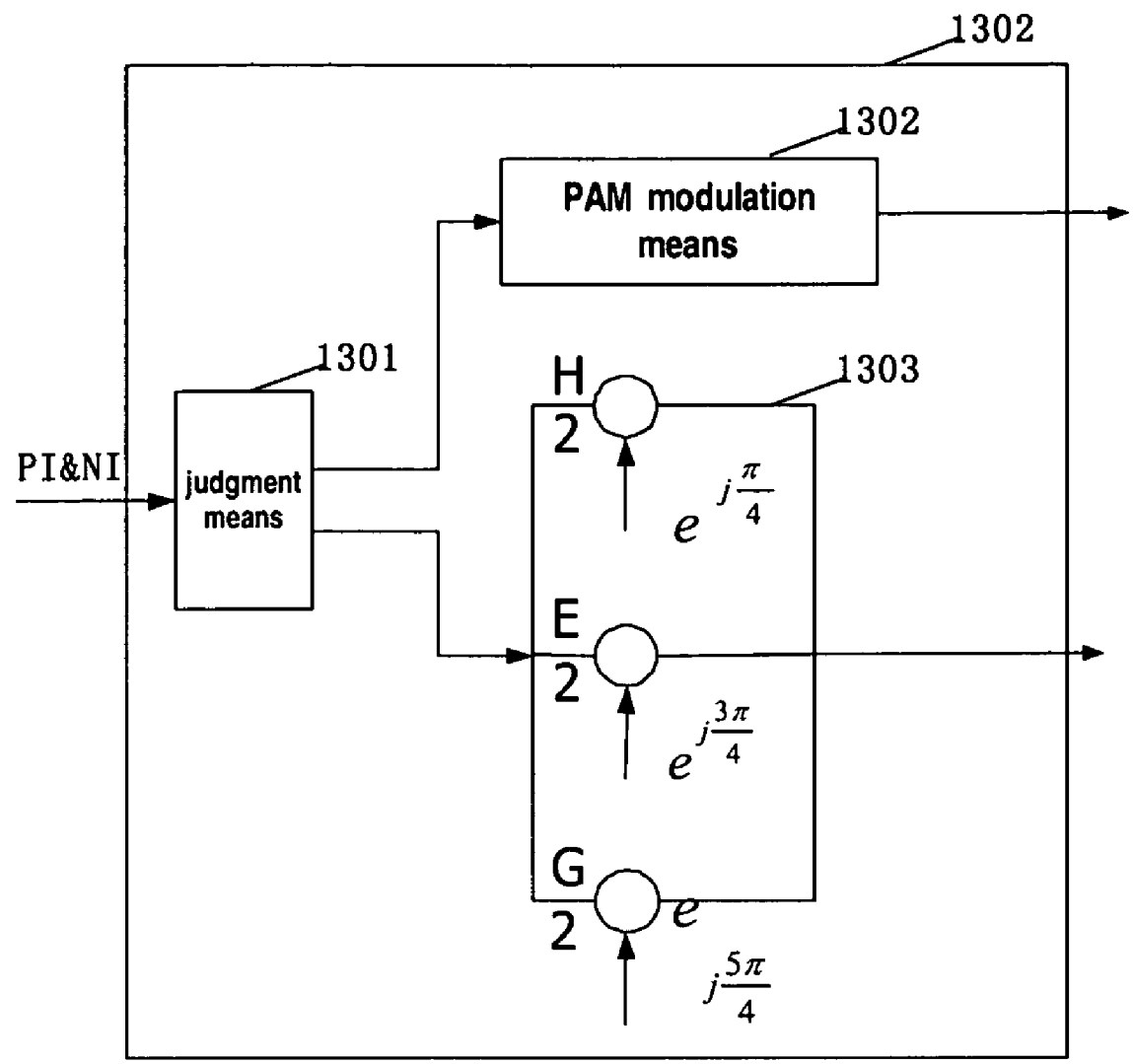
FIG. 13 is a structural schematic view of an A-QPSK modulation device according to the present invention in a transmitter.

Correspondingly, for the distribution of constellation points in FIG. 12, the schematic layout view of A-QPSK modulation means 1300 according to the present invention in the transmitter is as shown in FIG. 13.

The A-QPSK modulation means 1300 comprises: judgment means 1301, PAM modulation means 1302 and QPSK modulation means 1303. Among them, the judgment means 1301 receives a joint indicator signal formed by PI and NI, and decides which combination state the joint indicator denoted by the joint indicator signal belongs to.

If it is decided that the joint indicator of PI and NI belongs to a combination state where there is neither PI nor NI, i.e. corresponding to constellation point "F", the joint indicator signal is delivered to the PAM modulation means 1302 for PAM modulation and then is outputted. If it is decided that the joint indicator of PI and NI does not belong to a combination state where there is neither PI nor NI, i.e. corresponding to constellation point "F", "G" or "H", the joint indicator signal is delivered to the QPSK modulation means 1303 for conventional QPSK modulation and then is outputted.

In this way, according to expression (11), the power consumption $P_{ON}'$ of this modulation mode is obtained as follows:

$$P_{ON}'=4\cdot 2\cdot(p_r+p_q-p_r\cdot p_q) \tag{12}$$

It should be pointed out that, the extra appearance of coefficient "2" in expression (12) serves a purpose of guaranteeing the symbol error ratio (SER) and ensuring that the minimum Euclidean space among adjacent points in FIG. 12 is equal to that in FIG. 7-B. The ratio of the power consumption of the modulation mode presented in the present invention to the QPSK power consumption shown in FIG. 7-B is:

$$R_a = \frac{P_{A-QPSK}}{P_{QPSK}} = \frac{P_{ON}'}{P_{ON}} = 2\cdot(p_r+p_q-p_r\cdot p_q) \tag{13}$$

The modulation mode presented in the present invention has the following advantages over the QPSK mode presented in other proposals:

From the perspective of transmission power, this modulation implementation method reduces power consumption remarkably. For example, the transmission of MICH and PICH makes up about 2% of total downlink power of a cell, respectively. At a typical level of service characteristics, the proportion of this transmission power to the total power of a cell decreases to 1% or so when the A-QPSK mode is adopted. This is fairly beneficial to power-restricted MBMS services.

The improvement the present modulation implementation method has made in the performance of power consumption is not based on the enhancement of peak-average ratio (PAR) or the enhancement of symbol error ratio (SER).

Figure 14:
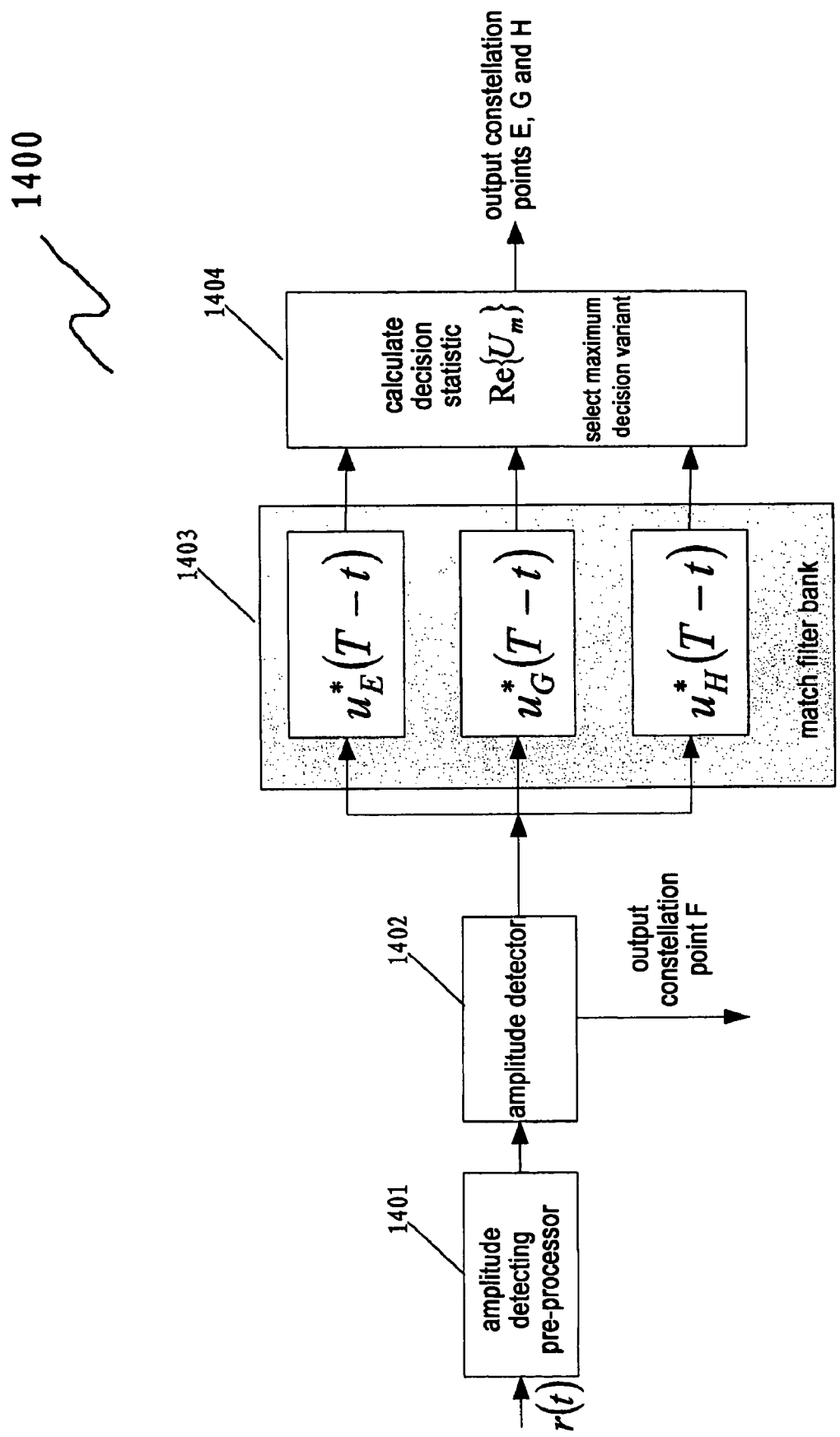
FIG. 14 is a structural schematic view of an A-QPSK demodulation device according to the present invention in a receiver.

FIG. 14 shows a schematic layer view of demodulation means 1400 in a receiver in a modulation mode according to the present invention. As shown in FIG. 14, a received signal is first processed by an amplitude detecting pre-processor 1401 and then delivered to an amplitude detector 1402 which detects and outputs constellation point "F". Next, the signal is delivered to a match filter bank 1403. After that, the signal which is outputted in three paths from the match filter bank 1403 is further delivered to a statistical decision means 1404 to calculate decision statistic, select the maximum decision variant and output constellation points "E", "G" and "H".

The result of detailed simulation proves that the SER performance of A-QPSK is at any rate not worse than that of QPSK. Under circumstances of Additive White Gaussian Noise channel, the SER of A-QPSK is close to that of QPSK. More importantly, the SER of A-QPSK is even better than that of QPSK under circumstances of Ralyeigh Fading Multi-path Channel.

In summary, the difference between the modulation mode of the present invention and the modulation mode of the prior art is that the present invention presents a modulation mode, namely A-QPSK mode which is more suitable to joint transmission of MICH and PICH. While making rational use of the priori knowledge of each information bit in NI and PI, the present mode also provides a corresponding improved Maximum a Posteriori Probability Receiver. As a result, the present invention boasts a better performance of power consumption than the prior art.

It is to be appreciated that the modulation method and corresponding modulation and demodulation devices provided by the present invention are also suitable to the transmission of other signals where an appearance probability of signal bit "1" or "0" is remarkably larger than an appearance probability of "0" or "1", e.g. the transmission of alarm signal where a priori probability of signal bit "1" (representing a normal situation) is much larger than a probability of the other signal bit "0" (representing an abnormal situation).

A comprehensive method of transmitting MBMS notification indicator is provided through processing in the Radio Network Controller (RNC) and the FP to obtain weight coefficients, loading the weight coefficients in the enhanced MICH frame and modulating the MICH frame. Using the present method, the MBMS "Notification Indicator Channel" in 3G mobile communication thereby has low false alarm ratio coupled with lower transmission power. Various alterations and modification can be made to the present invention without departing from the scope and concept thereof. The present invention is not limited to the above-described embodiments thereof except as defined in the appended claims.

What is claimed is:

1. A method of transmitting a first signal and a second signal in a wideband code-division multiple access network, wherein a probability of the appearance of signal bit "1" or "0" in each signal of the first signal and the second signal is remarkably higher than a probability of the appearance of "0" or "1", the method including:
   a step of determining constellation points, for determining combinations of different states of the first signal and the second signal and for determining each combination as a constellation point;
   a step of determining locations of constellation points, for determining a location of each constellation point on I-Q plane based on a priori knowledge of said combinations;
   and a step of transmission, for, after modulating said different combinations in different ways according to the location of each constellation point, transporting them to a user equipment via a physical channel.

2. The method of claim 1, wherein according to a priori knowledge of a state combination with high probability of appearance which is not required to notify a user equipment among said combinations, said step of determining locations of constellation points determines a location of the state combination to be on the origin of I-Q plane.

3. The method of claim 1, wherein said first signal is a paging indicator signal, and said second signal is a notification indicator signal.

4. The method of claim 3, wherein the state combinations of the paging indicator and the notification indicator include:
   1) where there is the paging indicator and the notification indicator;
   2) where there is the paging indicator without the notification indicator;
   3) where there is the notification indicator without the paging indicator; and
   4) where there is neither the paging indicator nor the notification indicator.

5. The method of claim 4, wherein according to a priori knowledge that a probability of the appearance of a state combination where there is neither the paging indicator nor the notification indicator is much higher than that of other state combinations, said step of determining locations of constellation points determines a location of the state combination where there is neither the paging indicator nor the notification indicator to be on the origin of I-Q plane.

6. The method of claim 5, wherein said step of modulating constellation points adopts pulse amplitude modulation for the constellation point which is located on the origin of I-Q plane, but adopts conventional phase shift keying modulation for other constellation points.

7. A modulation device (1300) in a transmitter, which is for modulating a first signal and a second signal, wherein a probability of the appearance of signal bit "1" or "0" in each signal is remarkably higher than a probability of the appearance of "0" or "1", the modulation device comprising:
   judgment means (1301), for receiving a joint signal of the first signal and the second signal in a wideband code-division multiple access network and for judging which combination state the joint signal is;
   pulse amplitude modulation means (1301), for, when the judgment means (1301) decides that the joint signal is a state combination with high probability of appearance which is not required to notify a user equipment, performing pulse amplitude modulation on the joint signal and outputting the result; and
   phase shift keying modulation means (1302), for, when the judgment means (1301) decides that the joint signal is a state combination which is required to notify a user equipment, performing conventional phase shift keying modulation on the joint signal and outputting the result.

8. The modulation device (1300) of claim 7, wherein the first signal is a paging indicator signal in the wideband code-division multiple access network, and the second signal is a notification indicator signal in the wideband code-division multiple access network.

9. The modulation device (1300) of claim 8, wherein said pulse amplitude modulation means (1301) is used for performing pulse amplitude modulation on the joint signal and outputting the result when the judgment means (1301) decides that the joint signal belongs to a state combination where there is neither the paging indicator nor the notification indicator; and
   said phase shift keying modulation means (1302) is used for performing conventional phase shift keying modulation on the joint signal and outputting the result when the judgment means (1301) decides that the joint signal does not belong to a state combination where there is neither the paging indicator nor the notification indicator.

10. A demodulation device (1400) in a signal receiver, which is for demodulating a joint signal of a first signal and a second signal, wherein a probability of the appearance of signal bit "1" or "0" in each signal of the first signal and the second signal is remarkably higher than a probability of the appearance of "0" or "1", the demodulation device (1400) comprising:
   amplitude detecting pre-processor (1401), for performing amplitude detection pre-processing on the joint signal of the first signal and the second signal, which have gone through pulse amplitude modulation and conventional phase shit keying modulation respectively;
   amplitude detector (1402), for performing amplitude detection on a signal, which has gone through amplitude detection pre-processing, and then outputting a constellation point whose amplitude is 0;
   match filter bank (1403), for filtering a signal remaining after the amplitude detector (1402) has performed detection and outputting; and statistical decision means (1404), for calculating decision statistic for a signal which is output in three paths from the match filter bank (1403), selecting a largest decision variant and then outputting a constellation points which have gone through conventional phase shit keying modulation.

11. A method of transmitting a first signal and a second signal in a wideband code-division multiple access network, wherein a probability of the appearance of signal bit "1" or "0" in each signal of the first signal and the second signal is remarkably higher than a probability of the appearance of "0" or "1", the method including:

a step of determining constellation points, for determining combinations of different states of the first signal and the second signal and for determining each combination as a constellation point;

a step of determining locations of constellation points, for determining a location of each constellation point on I-Q plane based on a priori knowledge of said combinations; and a step of transmission, for, after modulating said different combinations in different ways according to the location of each constellation point, transporting them to a user equipment via a physical channel, wherein said step of modulating constellation points adopts pulse amplitude modulation for a constellation point which is located on the origin of the I-Q plane, but adopts conventional phase shift keying modulation for other constellation points.

* * * * *

UNITED STATES PATENT AND TRADEMARK OFFICE
CERTIFICATE OF CORRECTION

PATENT NO. : 7,583,702 B2 Page 1 of 1
APPLICATION NO. : 11/295597
DATED : September 1, 2009
INVENTOR(S) : Liang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Fourteenth Day of September, 2010

David J. Kappos
*Director of the United States Patent and Trademark Office*